United States Patent [19]

Hinterwaldner

[11] 4,154,774
[45] May 15, 1979

[54] ADHESIVE, GLUING, PUTTY, SEALER AND COATING MATERIALS FROM (1) HARDENABLE COMPONENT, (2) METAL SALT AND (3) PULVERULENT OLEFIN POLYMER

[76] Inventor: Rudolf Hinterwaldner, Kastanienstr. 13, 8 Munich, Fed. Rep. of Germany

[21] Appl. No.: 711,295

[22] Filed: Aug. 3, 1976

[30] Foreign Application Priority Data

Aug. 4, 1975 [DE] Fed. Rep. of Germany ....... 2534737
Aug. 12, 1975 [DE] Fed. Rep. of Germany ....... 2535833

[51] Int. Cl.$^2$ .............................................. C08L 67/06
[52] U.S. Cl. ..................................... 260/862; 260/16; 260/40 R; 260/861; 260/863; 260/870; 260/878; 428/480; 428/483; 526/317
[58] Field of Search ............................. 260/862; 264/4

[56] References Cited

U.S. PATENT DOCUMENTS

| 3,051,679 | 8/1962 | Forsyth | 260/862 |
| 3,256,362 | 6/1966 | Graubner et al. | 260/862 |
| 3,551,378 | 12/1970 | Rabenold et al. | 260/862 |
| 3,704,264 | 11/1972 | Gorman | 264/4 |
| 3,779,966 | 12/1973 | Weeks et al. | 260/862 |
| 3,993,710 | 11/1976 | Alberts et al. | 260/862 |

FOREIGN PATENT DOCUMENTS 887693 12/1971 Canada ................................... 260/862

OTHER PUBLICATIONS

Kirk–Othmer: Encyclopedia of Chemical Technology, Second Edition, pp. 436–441; 451–456.
Herbig, James A., "Microencapsulation", Kirk–Othmer Encyclopedia, vol. 13, pp. 451–456 (1969).
"Unsaturated Polyesters", Kirk–Othmer Encyclopedia, vol. 20, pp. 833–855 (1970).

*Primary Examiner*—Harold D. Anderson
*Attorney, Agent, or Firm*—Toren, McGeady and Stanger

[57] ABSTRACT

A hardenable composition for use as an adhesive, putty, molding compound, sealer and for coating purposes composed of the reaction product of a monomeric, oligomeric or polymeric carboxylic acid and a compound of a metal of the second group of the periodic system which are capable of forming salts and a hardening agent. One or all of the components can be in protective sheaths or microencapsulated to prevent the hardening until the rupture thereof.

18 Claims, No Drawings

ADHESIVE, GLUING, PUTTY, SEALER AND COATING MATERIALS FROM (1) HARDENABLE COMPONENT, (2) METAL SALT AND (3) PULVERULENT OLEFIN POLYMER

BACKGROUND OF THE INVENTION

1. Field of the Invention

The present invention relates to liquid, pasty, thixotropic materials, which can be molded and hardened, for adhesive, gluing, putty, sealer and coating purposes. These materials are based on the reaction products of monomeric, oligomeric and/or polymeric carboxylic acids or derivatives of carboxylic acids, especially esters, which can be hardened and which have an acid number greater than 0.1, with compounds of metals of the second group of the periodic system, especially oxides and hydroxides, which are capable of forming salts. The invention furthermore relates to a process for the manufacture and hardening of such materials. For the sake of simplicity, the materials are referred to herein as "adhesive and coating materials".

2. Description of the Prior Art

According to the present state of the art, the rheological properties of adhesive and coating materials, based on carboxylic acids and their derivatives, such as, unsaturated polyester resins, can be altered only with mineral fillers and/or thixotroping materials, such as, colloidal silica, and others, such as, bentonites, in order to attain stable, pasty materials. Through the use of such thixotroping and/or filler materials in resin mixtures for adhesive and coating materials, the rheological properties can be modified in such a manner that the materials obtained can be processed in the specific field of application. However, the use of such thixotropic and modifier materials results in certain disadvantages.

One of these disadvantages, when only inert fillers are used for the manufacture of sediment-free, stable materials, is that the final properties are changed very greatly if the fillers are used in excessive amounts. When only known, thixotroping materials are used, stable materials are obtained which are, however, frequently too soft, greasy and have a "gel-like" character. Some of these disadvantages can be eliminated by the combined use of known thixotroping materials and inert fillers. However, the materials so modified are also sticky at the surface or they sweat or leach out liquid components, as a result of which they are not readily moldable and cannot be handled.

Materials filled with inert fillers, especially materials based on unsaturated polyesters, have the further disadvantage that they have a limited shelf-life, since they slowly harden or show a typical "drying effect" during storage. Therefore such materials frequently have a shelf-life of only a few months, as a result of which their use in many areas becomes impossible. Also, the frequent, relatively high shrinkage and the crack formation of such materials are also negative phenomena.

A further disadvantage, when working such fillers and/or thixotroping materials into resins and resin mixtures, arises from the fact that the viscosities increase very rapidly and that therefore the required amount of filler, for achieving a maximum "packing effect" can frequently not be worked in.

In the case of the addition of a large amount of known thixotroping materials and fillers, the hardening conditions are changed to such an extent, that they can only be compensated for by an above-average addition of reaction initiators. The major consequence however of such an overcatalysation is the fact that short-chain polymers are formed, which have completely different and inferior properties than comparable, unfilled materials.

In addition, the known thixotroping materials are frequently more expensive than the resins and resin mixtures themselves so that, in the case of large additions for achieving thixotropic adjustments, the products become considerably more expensive. It is a further disadvantage that, for achieving filled, thixotropic resin mixtures, mixing aggregates with high pumping efficiencies are required.

A further problem resides in the fact that such products can presently be supplied only as two-component or multi-component products, in the use of which, errors can arise during mixing the individual components. Those, not skilled in the art, cannot evaluate and judge the importance of such errors in mixing. Therefore, in many areas, noncritical materials are requested, which require no further manipulation, such as, weighing, mixing or homogenizing before use.

In order to avoid some of the above disadvantages, an attempt was made in preceding years to attain single-component systems by the use of incorporation of microencapsulated reactive materials. However, it turned out that the microcapsules deposited in the liquid medium, created new critical parameter due to their inhomogeneity with the other components.

Filled and/or thixotropic single-component materials, containing microencapsulated reactive materials and/or inert solvents, could not at all be manufactured until now, apart from the few, very slightly filled and possibly very slightly thixotropic liquids which are, without exception, soft fillers.

Furthermore, all the processing manipulations, associated with the manufacture of the above described materials are uneconomical.

Thus, in the entire technology, including the trade and the domestic sectors, there exists a real need for a single-component, reactive, thixotropic and/or moldable material, which does not possess the disadvantages mentioned hereinabove.

SUMMARY OF THE INVENTION

It is an object of this invention to remove these and other disadvantages of such materials, so that they become suitable for adhesive, gluing, sealer and coating purposes.

A further object of the present invention accordingly is the preparation of non-critical, reactive, thixotropic and/or moldable and hardenable single component materials having a long shelf-life, which have the properties and advantages of the known two-component and multicomponent systems.

I have now discovered that, in the case of a liquid or pasty, hardenable adhesive, gluing, sealer and coating material based on or containing one or more of the following reaction products:

of a hardenable, monomeric, oligomeric or polymeric carboxylic acid or carboxylic acid derivative having an acid number greater than 0.1, or mixtures thereof hereinafter sometimes referred to as "hardenable materials"; with a compound of the second group of the periodic system or mixtures of such compounds, which can form a salt with the above mentioned carboxylic acids or their derivatives hereinafter sometimes referred to as "second group compounds";
and containing furthermore at least one component to serve for the purpose of hardening, all these disadvantages can be removed when the products of the hardenable materials relative to the free carboxylic acid groups, and, at most, stoichiometric amounts of the second group compounds and especially metal oxides or hydroxides or mixtures of these compounds, and/or the component, serving for the purpose of hardening, are contained in sheaths which prevent their mutual reaction, but which can be destroyed by pressure, shear, rotational and/or torsional forces.

Admittedly, magnesium modified, unsaturated polyester resin compressed mats are known (see Krämer, Conze, Träger, "Basic Properties of Polyester Resin Compressed Mats and Possible Testing Techniques for their Determination", Kunststoffe, 1968, 913–918). However, these mats have a number of disadvantages and one particularly serious disadvantage.

Namely, on storage, products result which continuously become harder, i.e., the viscosity increases constantly and completely dry and hard products are obtained after a few days. This has been attributed to a slower, secondary metal coordination complex reaction. Accordingly, such compressed mats prematurely lose their ability to be processed. The loss of styrene also and possible spontaneous polymerization processes are further disadvantages.

After such negative findings, it was completely surprising to those skilled in the art that, when using the second group compounds and especially metal oxides and/or metal hydroxides (also termed basic materials in the following), which can form salts with carboxylic acid groups, these disadvantages can, in accordance with the invention, be completely prevented and the undesirable side reactions halted after specific maturing time.

This is possible when, at most, stoichiometric amounts of the salt-forming metal compounds of the second group of the period system, based on the free carboxylic acid residues of the hardenable carboxylic acids and/or their derivatives, are used. This is also one of the significant, inventive prerequisites for obtaining adhesive and coating materials with adequate shelf-life and stable viscosities. By these means, the viscosity can be adjusted to specified values.

DESCRIPTION OF THE PREFERRED EMBODIMENT

The stoichiometric amounts of basic materials can be determined and calculated from the acid number of the compounds to be neutralized. The amounts of basic materials to be added are generally between 0.1 and 8 percent by weight. A 0.6–0.9-fold stoichiometric amount of salt-forming compound of the second group of the periodic system, based on the free carboxylic acid groups in the hardenable carboxylic acid or carboxylic acid derivative, is preferred. Salt-formIng compounds are here also understood to include every compound of this group that is able to form a salt with the free carboxylic acid groups. These, in less than stoichiometric amounts favor, in addition, the storage and viscosity stabilities.

The functionality of the individual metal compounds, especially the metal oxides and/or metal hydroxides, of the second group of the periodic system in the reaction with free carboxylic acid groups is, as was surprisingly found, very different. When neutralizing with magnesium oxide and/or magnesium hydroxide, not only is the viscosity increased very greatly, but also the greatest thixotropic effect is achieved. On using zinc oxide and/or zinc hydroxide on the other hand, the increase in viscosity is significantly less in comparison with magnesium oxide and/or magnesium hydroxide, whereas the thixotropic property is defined more characteristically.

By these means and in accordance with the invention, the viscosity and thixotropy of the reaction products can be adjusted, depending on the requirements of the application, to specific values by using specific mixtures of several metal compounds, and especially the metal oxides and/or metal hydroxides from the second group of the periodic system.

In accordance with the invention, basic material mixtures of magnesium oxide and zinc oxide are preferred, whereby the ratio of one to another can vary between 99 : 1 and 1 : 99. If, for example, high viscosity and thixotropy are required, magnesium oxide by itself or a mixture of 99 parts magnesium oxide and 1 part zinc oxide can be employed. If only a high thixotropic value is required, without a marked change in the viscosity, zinc oxide can, for example, be used by itself or with appropriate amounts of magnesium oxide. Barium and/or strontium oxides and/or hydroxides can also be used for the neutralization of the free carboxylic groups. However, for economic reasons, the oxides and/or hydroxides of the metals, magnesium and/or zinc, are preferred.

Preferred compounds are those that have a low bulk weight and a water content of less than 2.0% and especially less than 1.5%. Reverse thixotropic tendencies can already be observed when the water content exceeds 2%.

Generally, heating supports the reaction.

A further inventive advantage is the fact that reaction products can be produced which are plastically moldable and do not become sticky at room temperature and accordingly, inter alia, do not adhere to the hands. In their plastic properties, the materials are comparable to the known mastic and moldable materials.

The hardenable compounds are for use in accordance with the present invention are preferably unsaturated compounds that have at least one free carboxyl group and are selected from monomers, dimers, oligomers and polymers and can be present in different mixing ratios to one another. They can be used individually or mixed together. Examples of unsaturated compounds with free carboxylic groups are, inter alia, carboxylic esters and/or polyesters, which have ester groupings within the chain of the molecule as well as in the side group. Unsaturated polyesters can have especially a hydroxethyl or a dihydroxethylaniline group. To the group of polyesters, in which the ester group is a link within the molecule chain, belong, inter alia, such polycondensates that still contain double bonds in the main chain of the molecule and are synthesized from dicarboxylic acids and polyalcohols.

As examples of dicarboxylic acids, maleic acid, fumaric acid, phthalic acid, isophthalic acid, terephthalic acid, adipic acid, itaconic acid, citraconic acid, mesaconic acid, sebacic acid, trimellitic acid and dimeric fatty acids may be mentioned.

Phenol acid resins, e.g. from 4,4-bis(4-hydroxyphenyl)valeric acid and also such unsaturated polyester resins with epoxide-resin-like structure also belong to this group.

A very large number of compounds may be used as the polyalcohols, of which the glycols, such as ethylene glycol, propylene glycol and butylene glycol, occupy an important place. Further suitable polyols are, for example, a cyclohexanediol, bisphenol A, bisphenol F, dialkyl malleate, neopentyl glycol and many more. These unsaturated polyesters are frequently dissolved in reactive, unsaturated monomers such as, for example, monostyrene, α-methylstyrene, acrylates, methacrylates, methyl methacrylates, vinyl acetate, divinyl benzene, acrylonitrile, diallyl phthallate, triallyl phosphate.

Polyesters, which contain the ester group in the side group, include inter alia polyacrylic esters and polymethacrylic esters.

The following may be mentioned, inter alia, as saturated or unsaturated carboxylic acids and their derivatives, especially the carboxylic acid esters: acrylic acid, methacrylic acid, phthalic acid, hexahydrophthalic acid, maleic acid, fumaric acid, polyacrylic acid, esters of acrylic and methacrylic acid, such as, 2-hydroxyethyl methacrylate, tetraethylene glycol dimethacrylate, 1,2-propyleneglycol monomethacrylate and 2-hydroxethyl acrylate.

The metal oxides and metal hydroxides of the second group of the periodic system are oxides and hydroxides of magnesium, calcium, barium and zinc.

Those skilled in the art have at their disposal a multitude of unsaturated compounds, e.g., as monomers, prepolymers and polymers as raw materials for the manufacture of adhesive and coating materials. However, the raw materials do not always contain any free carboxyl groups with which the viscosity and the thixotropy may be adjusted in accordance with the present invention.

Surprisingly, it has now been found that such organic carboxylic acids and/or their derivatives, especially unsaturated carboxylic acids with at least one double bond, can be added to such raw materials, if there is at least a partial compatibility.

Examples of materials are unsaturated compounds, such as, vinyl-group-containing monomers, dimers and/or prepolymers, such as, styrene, vinyl benzoate, acrylic acid, methacrylic acid, acrylates and methacrylates. Furthermore, inert solvents, such as, toluene and xylene may also be added.

Unsaturated carboxylic acids are preferably used, because they are incorporated in the resulting macromolecule during the polymerization. The carboxylic acids or their derivatives are preferably added to the unsaturated compounds before they are reacted with the salt-forming compounds of the second group of the periodic system, since the salts can frequently have a decreased solubility during the subsequent addition. Mixtures of any hardenable compounds, e.g., hardenable polyesters with one or more hardenable monomeric, oligomeric or polymeric carboxylic acids or carboxylic acid derivatives can thus also be used. Preferably, this mixture should then have an acid number in excess of 0.1.

The reaction product and/or the components serving for the purpose of hardening are surrounded by sheaths. In the technical sense, the concept "sheaths" is understood to mean an enveloping wall material, preferably capsules and especially microcapsules, for liquid, pasty, semi-solid and/or solid materials, in order to inactivate these materials temporarily and protect them from the effects of their environment. The microencapsulation can be carried out according to generally known process using conventional materials.

The reacted materials, temporarily rendered inactive by the sheaths, are preferably present in microencapsulated form, whose capsule sizes are less than 1.500 μm and preferably less than 1.000 μm. In the case of microencapsulated reaction initiators and/or reaction accelerators, capsule spectra of less than 300 μm and preferably less than 100 μm are preferred for achieving, in accordance with the invention, a high distribution coefficient in the adhesive and coating material.

Components which can be used for the purpose of hardening, include reaction initiators, such as, inorganic and/or organic peroxy acids, peroxides, hydroperoxides, ozonides and the like, such as, for example, potassium and ammonium peroxydisulfate, dibenzoyl peroxide, p-chlorobenzoyl peroxide, acetylacetone peroxide, di-tert.-butyl peroxide, methyl ethyl ketone peroxide, cyclohexane peroxide, dicumylhydroperoxide, t-butylhydroperoxide, cumolhydroperoxide, pinene hydroperoxide, terpineol ozonide. Other reaction partners include compounds with vinyl groups, e.g., styrene, vinyl benzoate, as well as accelerators, such as, organometallic compounds, such as, cobalt naphthenate, vanadium acetylacetonate, amines, such as, t-ethylamine or t-butylamine, dimethylaniline, diethylaniline, dimethyl-p-toluidine, azo catalysts, such as, azoisobutyric nitrile, mercaptans, such as, lauryl mercaptan, bis-(2-ethylhexyl) sulfide, and bis-(2-mercaptoethyl) sulfide. The fact that the carboxylic acids or their derivatives are present in the form of reaction products has no effect on the hardening reaction, e.g., the radical polymerization.

A significant, further improvement of the present invention is carried out by the presence of polyolefin powders or, if necessary, known thixotroping materials. With the presence of such materials, it was surprisingly found that not only is there an increased rate for the reaction between the hardenable carboxylic acid or its derivative and the compound of the second group of the periodic system for achieving the final viscosity and the final thixotropy when using a three-component or a multi-component mixture, but also, as the result of synergistic effects, the storage stability and other properties can be significantly improved. This synergistic effect can be ascribed to the components, the polyolefin powder and the metal compound or metal oxide and/or metal hydroxide of the second group of the periodic system.

The development of the synergistic effect in accordance with this invention can be significantly increased by using not only unsubstituted, linear or branched chain, nonpolar homopolymers, e.g., polyethylene and/or polypropylene, as the polyolefin powder, but that at least a portion can be replaced by olefin copolymers, which are substituted with polar groups. In accordance with the invention however, the preferred polyolefin copolymers are those produced by grafting unsaturated carboxylic acids and/or their derivatives to the saturated, olefinic, main polymer chain.

A synergistic effect with the compounds, especially the oxides and hydroxides, of the second group of the periodic system, are generated, for example, by ethylene-vinyl acetate copolymers and ethylene-acrylate copolymers. Preferably however, the olefin copolymers used are those obtained by grafting of, inter alia, unsaturated carboxylic acids and/or their esters, such as, for example, acrylic acid, methacrylic acid, maleic acid, fumaric acid and their esters, ethyl acrylate and 2-hydroxyethyl methacrylate.

The grafted, comonomer content can for example amount to between 0.1 and 100 percent by weight, based on the polyolefin. Preferably the olefin copolymers used contain carboxylic acids, such as, acrylic acid, methacrylic acid, and methacrylic acid to the extent of 0.5 to 25 percent by weight.

It has furthermore been found that the polyolefin powders should have a particle size less than 500 μm and preferably less than 100 μm. Although the inventive synergistic effect is also achieved with polyolefin powders having a particle size greater than 500 μm it is developed to a significantly lesser extent than with finer particles.

The amounts of polyolefin powder added can vary within wide limits, depending on the viscosity and thixotropy values to be attained. Generally however, they lie between 0.1 and 50, preferably 1-20 and most preferably, 3-15 percent by weight, based on the compound carrying the free carboxyl group.

The development of the synergistic effect between the basic materials and the polyolefin powders can be accelerated significantly by heating or tempering the mixtures and can thereby be concluded sooner.

A particularly advantageous reaction product can be achieved in accordance with this invention while using the synergistic effect of the compounds of the second group of the periodic system with a polyolefin powder, if a first or fundamental viscosity and/or thixotropy is produced by the stoichiometric amount and the limiting or final required value of the viscosity and/or thixotropy is adjusted by means of the polyolefin powder. With a reaction product with basic magnesium compounds, viscosity values of about $10^6$ cP can be adjusted, whereas, in the case of unfilled reaction products, viscosities lower than $10^6$ cP, and especially viscosities between $10^2$ and $10^5$ cP can also be achieved by utilizing the synergistic effect.

Surprisingly it was found that not only were internal stresses and cracks in the hardened end products greatly lessened by the addition of polyolefin powders, but the shrinkage was also considerably decreased.

An addition of known thixotroping materials, such as, for example, colloidal silica gel, to the inventive adhesive and coating materials can advantageously be used if the unfilled products cannot be heated. However, even so, a rapid, initial thixotropy is required, in order to prevent sedimentation of the specific, heavier filler particles until each times that the inventive thixotropy system can take over its full functions. The known thixotroping materials can have further effects in that they endow the inventive adhesive and coating materials with yet additional, different, rheological properties, such as, increased dilation. The term, known thixotroping materials, is understood to include, inter alia, those that produce the thixotropic properties in the unsaturated, compounds belonging to the class of polyesters, carboxylic acids and/or their derivatives. Highly disperse silica gel, bentonites, bentonite derivatives and the like are such thixotroping materials.

The iventive adhesive and coating materials can furthermore contain fillers, pigments and the like. If inorganic fillers that contain metal oxides and/or metal hydroxides of the second group of the periodic system or other materials that uncontrollably effect and/or disturb the neutralization reaction and/or the development of the synergetic effects are used, these fillers are inactivated in accordance with the invention by enveloping them with suitable coating materials, such as, fatty acids, fatty esters, silanes and the like.

All types of inorganic and organic substances are suitable as fillers, such as, inter alia, finely ground quartz and quartz sands, Neuburger silicas, kaolin, chalk, talcum, barium sulfate, light spar, asbestos powder, asbestos fibers, glass fibers, stone wool, durplast powder, phenoplast and aminoplast powder, wood flours, textile fibers, metal powders and the like. Coarse particulate fillers preferably have a particle size of less than 2 mm and especially less than 1.5 mm. Other compatible compounds, such as, softeners, bitumens, tars, asphalts, pitches and the like may also be contained.

The manufacture of the inventive reaction products can take place in a number of ways, inter alia, by first initiating, for example through the addition of a slight amount of water, the less than stoichiometric or the stoichiometric reaction of one or more of the basic materials with the carboxylic acid or the carboxylic acid derivatives carrying the carboxyl group. Subsequently, one or more polyolefin powders are added.

In order to accelerate the reaction or the development of the synergetic effects, the mixtures can be heated in proportion to the heat sensitivity of the hardenable carboxylic acid or its derivatives. This is preferably required when a rapid increase in viscosity and/or the development of thixotropy is necessary in order to prevent the sedimentation of additives of greater density. This acceleration is favored further by the addition of between 0.1 and 3 percent by weight water, based on the amount of basic materials to be added.

In those cases where heating is not possible, after the salt-forming compound and the polyolefin powder have been added, such an initial thixotropy can be developed in the inventive adhesive and coating materials by incorporating known thixotroping agents, such that sedimentation of heavy filler particles is prevented in the first phase.

From compounds of the second group of the periodic system and the free carboxyl groups of hardenable carboxylic acids or their derivatives, a paste can be produced on a roller frame with adequate roll clearance and low roll friction. Such pastes are advantageously used, when adhesive and coating materials are to be produced whose properties may only vary within very narrow tolerances.

A further object of the present invention is the manufacture of hardenable, single-component materials. It was found that the microencapsulated components for hardening and/or the angular, sharp, filler particles can be incorporated non-destructively into the reaction products of the invention, if they are mixed in before the viscosity and/or the thixotropy is fully developed. In order to reduce their friction, the surfaces of the microcapsules and/or angular, sharp fillers are advantageously wetted with a plasticizer.

For the manufacturing process itself, such known mix aggregates are suitable which, before the viscosity and/or thixotropy is fully developed, generate no or only very slight shear forces in the mix. Immediately after the mixing process is concluded, the inventive adhesive and coating materials can be packaged by filling into containers such as tubes, cartridges, cans, large shipping containers and the like. For this purpose, the known squeezing equipment that works with low pressures is preferably suitable.

In the case of the inventive adhesive and coating materials, hardening can be initiated and effected such that, before, during and/or after application or introduction of the material, pressure, shear, rotational and/or torsional forces are applied thereto, the sheaths are at least partially destroyed and the contents are brought to the state where the reaction takes place between the material for hardening the reaction product of the carboxylic acid or its derivative. In many applications, such forces are in any case required in order to make contact between two materials or to coat surfaces.

Thus, in adhesive and sealing technology, pressures are frequently required in order to combine two material or substrate surfaces with one another or to seal them. For example, when bolting fasteners with threads, such as, screws or tie bars, shear and/or torsional forces arise as these fasteners are positioned or screwed in. Pressures are also developed when coating and/or priming a surface with primers, and torsional forces as these primers are spread. Furthermore, the inventive adhesive and coating materials can also be reactivated before their application, for which purpose, extruder equipment, roller frames, ball mills and the like are suitable.

If a high degree of wettability is required for special purposes, it is also possible to work with materials that contain in addition microencapsulated, volatile or reactive solvents.

Using the inventive adhesive and coating materials, a multitude of materials and substrates can be joined to one another and with one another. These materials and substrates include metals, such as, aluminum, iron, steel, copper, glass, concrete, stones, ceramics, elastomeric plastics, such as, thermoplasts and duropolasts, wood and wood-based materials, plastic films, plastic laminates, textiles and the like.

If plastic, elastic and/or flexible adjustment of the inventive adhesive and coating materials are used, the above material or substrate surfaces can be primed or coated with the inventive adhesive and coating materials. Furthermore, such modifications are also suitable, inter alia, for sealing joints surfaces and the like. Specific adjustments can be used as repair putty or mortar.

Moreover, surfaces can be precoated with the inventive adhesive and coating materials and only activated at a later time by pressure, shear, rotational and/or torsional forces.

A special mode of application of the inventive adhesive and coating material is, inter alia, its use as a bolting adhesive, in order to glue fasteners of all types, preferably those with a thread, into drilled holes without having to use a locking device (generally plastic bolts). At the same time, the edges of the drilled holes are filled with the adhesive and coating material, thus saving the additional processing step of applying a hydraulically bonding putty. In industrial technology, in the trade, handicrafts and domestic use, there exists a multitude of further application possibilities.

The invention is illustrated in greater detail by the following examples, without however being limited to them.

A.

PREPARATION OF REACTION PRODUCTS FROM HARDENABLE CARBOXYLIC ACID OR ITS DERIVATIVES AND COMPOUNDS OF THE SECOND GROUP OF THE PERIODIC SYSTEM

Example 1a 3.4 parts by weight of magnesium oxide (light, DAB 6) were worked with rapid stirring into 100 parts by weight of an unsaturated polyester resin solution, produced by condensing 2 moles maleic acid, 1 mole phthalic acid, 1.1 mole ethylene glycol and 2.1 mole 1,2-propylene glycol and dissolving in styrene (styrene content 40%), the polyester resin solution having a viscosity of 850 cP (DIN 53015) and an acid number of 18 (DIN 53042). The amount of magnesium oxide corresponded to about the stoichiometric quantity for the complete neutralization of the free carboxyl groups. After two hours, the viscosity increased to 2 to $3 \times 10^5$ cP. The final viscosity was reached after 10 days and amounted to several $10^6$ cP. At that time, a distinct thixotropic effect had developed. At the same time, the acid number had decreased to a value of 1.0 mg KOH/g of unsaturated polyester resin. The material was not sticky and could be worked plastically. DAB is the German Pharmacopeia and DIN are the German Industrial Standards.

Example 2a 4.3 parts by weight of zinc oxide were actively worked, with rapid stirring, into 100 parts by weight of the same polyester resin solution (styrene content 40%) having a viscosity of 850 cP and acid number of 18. After 2 hours, the viscosity increased to $3 \times 10^4$ cP and, at the same time, a distinct thixotropy effect had developed. After 10 days, final viscosity of $5 \times 10^5$ cP and a characteristically developed thixotropy were determined. At the same time, the acid number had decreased to 0.9 mg KOH/g resin.

Example 3a

For reaction with less than the stoichiometric amount, 100 parts by weight of polyester resin (styrene content 30%) having a viscosity of 700 cP and an acid number of 28, were worked into 8.5 parts by weight of a mixture of magnesium oxide and zinc oxide (mixed in the proportion of 1:4). At the same time, 0.5 percent by weight water, based on the mixture of basic materials, were added. After 2 hours, the viscosity had adjusted to $9 \times 10^4$ cP and there was distinct thixotropy. After 3 days, the final viscosity of $8 \times 10^5$ cP and the characteristics thixotropy development had been attained. The acid number was 12. The plastic material was not sticky, could be worked and remained in place even on vertical surfaces.

Example 4a

For developing the synergistic effect between the basic material and polyolefin powder, 6 parts by weight of magnesium oxide were worked with rapid stirring into 300 parts by weight of an unsaturated polyester resin (styrene content 30%), having a viscosity of 600 cP and an acid number of 28. This batch was divided into three portions, each of 100 parts by weight and to
sample 1, 2 parts by weight of polyethylene powder,
sample 2, 4 parts by weight of polyethylene powder,
sample 3, 6 parts by weight of polyethylene powder, were added. The polyethylene powder was produced from a low-pressure polyethylene with a melt index of 0.2 (230° C./5 kg) and had a particle size of 50 μm. After one hour, the following viscosities were determined sample 1:2 × 10⁵ cP
sample 2:5 × 10⁵ cP
sample 3:3 × 10⁶ cP.

The acid number was 18.

Example 5a

Example 4 was repeated, however, a grafted copolymer powder, with a particle size of 50 μm, was used instead of the polyethylene powder. The grafted copolymer had a melt index of 1.6 (230° C./2kg) and an acrylic acid content of 5.2%. After one hour, the following viscosities were measured:

sample 1:2 to 3 × 10⁵ cP
sample 2:3 × 10⁵ cP
sample 3:2 × 10⁶ cP

These viscosities and the thixotropy did not change during the course of a month.

EXAMPLE 6a 5 parts by weight hexahydrophthalic acid were added to 100 parts by weight unsaturated polyester resin with a styrene content of 40%, a viscosity of 630 cP and an acid number of 8. Subsequently, 3 parts by weight of a mixture of basic materials, consisting of magnesium oxide and zinc oxide in the ratio of 1:4, and 6 parts by weight of an ethylene-vinyl acetate copolymer powder (vinyl acetate content 17%) were worked in. After 2 hours, a viscosity of 6 × 10⁵ and a distinct thixotropy could be detected. The acid number had changed to 10 mg KOH/g resin.

EXAMPLE 7a 100 parts by weight of 2-hydroxyethyl acrylate, containing about 2% of free acrylic acid, were treated with 2 parts by weight of magnesium oxide and allowed to stand for 24 hours. The viscosity increased thereby from 9 cP to 2 × 10⁴ cP.

B.

PREPARATION OF HARDENABLE ADHESIVE AND COATING MATERIALS

All the inventive adhesive and coating materials, described in the following examples, were prepared according to the procedure described in the following. Initially, the microencapsulated materials were worked, with slowly running mixing equipment (500 rpm) into the liquid, hardenable solution of the carboxylic acid or its derivatives, e.g., into an unsaturated polyester solution. Subsequently, the thixotroping and-/or viscosity-increasing additives were mixed in with rapidly running mixing equipment (1,000 rpm). Heating and/or the slight addition of water, for the purpose of developing thixotropy and/or viscosity more rapidly, took place in this step. Finally, possible filler quantities are worked in.

If the material is to be colored or if it is necessary to add a plasticizer, then this operation is carried out before the microencapsulated materials are worked in.

Packaging of the adhesive and coating materials so prepared, in tubes, cartridges, cans, large containers and the like, should take place before the thixotropy and/or viscosity are fully developed.

EXAMPLE 1b

The following adhesive material was prepared according to the above described procedure:

100 parts by weight unsaturated polyester resin*
8 parts by weight microencapsulated benzoyl peroxide, in a plasticizer at concentration of 40%
2 parts by weight magnesium oxide, light, DAB
4 parts by weight polyethylene powder, particle size <50 μm
50 parts by weight chalk, coated
38 parts by weight quartz sand, particle size <2 mm

*viscosity (DIN 53 015):800 cP
styrene content:30%
acid number (DIN 53 042):16

After 2 days, the adhesive material had reached its final viscosity of 3 × 10⁶ cP and it was thixotropic.

The adhesive material was reactivated by extended mastication by hand 2-3 minutes). Aluminum strips were glued with the reactivated material. The tensional shear strength was 50 kg/cm² after 2 hours
70 kg/cm² after 24 hours Furthermore, 2 small concrete blocks were glued together with the reactivated material. A bending strength test (DIN 1164) was carried out after 24 hours, in which the break occurred outside of the glue line.

EXAMPLE 2b

An adhesive plug material had the following composition:

100 parts by weight polyester resin*, preaccelerated
15 parts by weight microencapsulated benzoyl peroxide, at a concentration of 40% in the plasticizer
1 part by weight magnesium oxide
4 parts by weight zinc oxide active
6 parts by weight olefin graft copolymer powder with 2.1% acrylic acid content, particle size <30 μm
20 parts by weight Neuburger silica, particle size <2 μm
34 parts by weight quartz sand, particle size <0.3 mm

*styrene content:30%
viscosity:800 cP
acid number:32

This adhesive plug material was filled into tubes and cartridges. Boreholes were drilled in concrete of grade B 300 and then filled with the adhesive plug material. Subsequently, normal steel screws were set by hand and tie bars by machine. The drilling dust had previously been removed from the boreholes. The following results were obtained:

| No. | Dimensions of Screws and Plugs | Diameter of Borehole in mm | Type of Setting | Hardening Time in hours | Pull-out Value** kg |
| --- | --- | --- | --- | --- | --- |
| 1 | steel screws M4 | 4.0 | Hand* | 4 | 50 |
| 2 | steel screws M4 | 4.5 | Hand | 4 | 40 |
| 3 | steel screws M4 | 4.0 | Hand | 24 | 75 |
| 4 | steel screws M4 | 4.5 | Hand | 24 | 75 |
| 5 | tie bars M12 | 12.5 | machine** | 2 | 1600 |
| 6 | tie bars M12 | 13.0 | machine | 2 | 1400 |
| 7 | tie bars M12 | 12.5 | machine | 24 | 3200 |

-continued

| No. | Dimensions of Screws and Plugs | Diameter of Borehole in mm | Type of Setting | Hardening Time in hours | Pull-out Value** kg |
|---|---|---|---|---|---|
| 8 | tie bars | 13.0 | machine | 24 | 2400 |

*hand: the steel screws were screwed by hand into the adhesive plug material in the borehole
**machine: the tie rods were set by rotation (drill) into the adhesive plug material
***the materials were completely hardened after 24 hours.

Concrete residues adhered to the hardened adhesive plug material. The break or shearing off therefore occurred outside of the glue line. Two tie-bar breaks were noted in experiment 7.

All results are the average values of 5 individual tests.

EXAMPLE 3b

The metal adhesive below had the following composition:
- 100 parts by weight unsaturated polyester resin*
- 20 parts by weight 2-hydroxyethyl methacrylate**
- 10 parts by weight microencapsulated benzoyl peroxide, at a concentration of 40% in a plasticizer, particle size <200 μm
- 2 parts by weight magnesium oxide
- 4 parts by weight zinc oxide
- 14 parts by weight grafted olefin copolymer powder, with 6.5% methacrylic acid, particle size <50 μm

*styrene content: 20%
viscosity: 2200 cP
acid number: 28
**free methacrylic acid content: 2%

Steel/steel and aluminum/aluminum gluings were carried out with this adhesive. The steel surfaces were sandblasted and the aluminum surfaces were pretreated by pickling (sulfuric acid — sodium chromate). The test pieces were prepared according to DIN 53,281. To reactivate the adhesive material, the glued surfaces were pressed in a gluing device. The pressure amounted to about 5-8 kg/cm². The following values were determined after a pressing time of 1 hour followed by storage at 20° C. for 4 hours:
Steel/steel gluing*: 124 kg/cm²
aluminum/aluminum gluing*: 117 kg/cm²
*the average value from 5 individual tests

EXAMPLE 4b

The following putty material was produced:
- 100 parts by weight polyester resin*
- 12 parts by weight microencapsulated benzoyl peroxide, at a concentration of 40%, particle size: 140-250 μm
- 1 part by weight magnesium oxide
- 4 parts by weight zinc oxide
- 7 parts by weight grated olefin copolymer powder with 25% by weight methacrylic acid, particle size <20 μm
- 6 parts by weight color paste, white
- 10 parts by weight talcum
- 20 parts by weight kaolin
- 20 parts by weight chalk
- 20 parts by weight barium sulfate

*styrene content: 40%
viscosity: 1500 cP
acid number: 28

A beechwood and an iron surface were puttied with this putty material, using a Japanese putty knife.

As the putty was worked, and under the pressure of the putty knife, the putty material was reactivated. As a result of the homogeneous viscosity structure, a closed putty film was produced. After 8 hours had elapsed, the putty film was thoroughly hardened and not sticky and could be ground with an abrasive.

Example 5b

The following sealer was produced:
- 100 parts by weight unsaturated polyester resin mixture*
- 10 parts by weight microencapsulated benzoyl peroxide, at a concentration of 40%
- 2 parts by weight magnesium oxide
- 3 parts by weight zinc oxide, active
- 15 parts by weight polypropylene powder
- 15 parts by weight asbestos powder
- 20 parts by weight glass fiber

*styrene content: 20%
viscosity: 3700 cP
acid number: 25

The sealing material was applied to both of the surfaces of the flange to be joined and the flange was subsequently bolted. After 2 hours, it was subjected to a water pressure of 10 kg/cm². The pressure was removed after 8 days. No leak was observed during this time.

I claim:

1. A composition suitable for use as an adhesive, putty, sealing, or coating material consisting essentially of the reaction product of:
   a) a hardenable component selected from the group consisting of unsaturated monomeric, oligomeric, or polymeric carboxylic acids and esters thereof having an acid number in excess of 0.1; with at most a stoichiometric amount of
   b) a salt forming component of a metal of the second group of the periodic system; and
   c) a pulverulent olefin polymer selected from the group consisting of polyolefin copolymers with acrylates or vinyl acetate and a grafted polyolefin copolymer grafted with acrylic or methacrylic compounds, the olefin polymer being present in an amount from 0.1 to 50% by weight based on the weight of the reaction product,
   which composition further contains a hardening agent and wherein the reaction product, the hardening agent or both are contained in rupture protective sheaths which prevent their reaction with one another until rupture thereof.

2. The composition of claim 1 wherein the salt forming compound is a metal oxide or hydroxide.

3. The composition of claim 1 wherein the hardenable component is selected from the group consisting of ethylenic unsaturated monomeric and polymeric compounds.

4. The composition of claim 3 wherein the hardenable component is selected from the group consisting of unsaturated polyesters and monomeric or polymeric acrylic acid, methacrylic acid, their derivatives and esters.

5. The composition of claim 3 wherein the metal is selected from the group consisting of magnesium, zinc and calcium.

6. The composition of claim 5 wherein the salt forming compound is an oxide or hydroxide.

7. The composition of claim 1 wherein the hardening agent is selected from the group consisting of reaction initiators, reaction accelerators, and catalysts.

8. The composition of claim 7 wherein the hardening agent is a reaction initiator selected from the group consisting of organic peroxide acids, inorganic peroxide acids, peroxides and hydroperoxides.

9. The composition of claim 7 wherein the hardening agent is a reaction accelerator selected from the group consisting of amines, organo-metallic compounds, azo compounds and mercaptans.

10. The composition of claim 9 wherein the organo-metallic compound is cobalt naphthenate or vanadium acetylacetonate.

11. The composition of claim 7 wherein the hardening agent is a coreactant selected from the group consisting of styrene and vinyl benzoate.

12. The composition of claim 1 wherein the reaction product, the hardening agent or both are micro-encapsulated.

13. The composition of claim 1 wherein the amount of olefin polymer is between 3 to 15% by weight.

14. The composition of claim 1 wherein the olefin polymer has a particle size less than 500 $\mu$m.

15. The composition of claim 14 wherein the olefin polymer has a particle size in the range from 10 to 100 $\mu$m.

16. The composition of claim 1 which further comprises an additive selected from the group consisting of inorganic fillers, organic fillers, thixotroping materials and pigments.

17. A method for the preparation of the composition of claim 1 comprising incompletely reacting the hardenable component and the salt forming compound to form a partial reaction product having an intermediate viscosity value, working the hardening agent encased in sheaths into the partial reaction product and then further reacting the partial reaction products to achieve the final desired viscosity.

18. The method of claim 17 wherein the outer surface of the sheaths is initially coated with the hardenable component before the sheaths are worked in.

* * * * *